United States Patent
Tucker (10) Patent No.: US 9,939,280 B2
(45) Date of Patent: Apr. 10, 2018

(54) COMPUTER-IMPLEMENTED SYSTEM AND METHOD FOR DYNAMIC TRAVEL COORDINATION

(71) Applicant: Palo Alto Research Center Incorporated, Palo Alto, CA (US)

(72) Inventor: Simon Tucker, Oakland, CA (US)

(73) Assignee: Palo Alto Research Incorporated, Palo Alto, CA (US)

( * ) Notice: Subject to any disclaimer, the term of this patent is extended or adjusted under 35 U.S.C. 154(b) by 148 days.

(21) Appl. No.: 15/183,749

(22) Filed: Jun. 15, 2016

(65) Prior Publication Data
US 2016/0298979 A1    Oct. 13, 2016

Related U.S. Application Data

(63) Continuation of application No. 14/954,781, filed on Nov. 30, 2015, now Pat. No. 9,372,090, which is a continuation of application No. 14/244,860, filed on Apr. 3, 2014, now Pat. No. 9,200,911.

(51) Int. Cl.
| | |
|---|---|
| G01C 21/00 | (2006.01) |
| G01C 21/34 | (2006.01) |
| G06Q 50/00 | (2012.01) |
| G06Q 10/02 | (2012.01) |
| H04L 12/58 | (2006.01) |
| H04L 29/08 | (2006.01) |
| G06Q 10/10 | (2012.01) |
| G06Q 50/14 | (2012.01) |

(52) U.S. Cl.
CPC ..... *G01C 21/3438* (2013.01); *G01C 21/3423* (2013.01); *G06Q 10/02* (2013.01); *G06Q 10/1095* (2013.01); *G06Q 50/01* (2013.01); *G06Q 50/14* (2013.01); *H04L 51/32* (2013.01); *H04L 67/18* (2013.01); *H04L 67/22* (2013.01)

(58) Field of Classification Search
CPC . G01C 21/3438; G01C 21/3423; G06Q 10/02
See application file for complete search history.

(56) References Cited

U.S. PATENT DOCUMENTS

| | | |
|---|---|---|
| 2006/0059024 A1 | 3/2006 | Bailey et al. |
| 2008/0201227 A1 | 8/2008 | Bakewell et al. |
| 2008/0293430 A1 | 11/2008 | Blom et al. |

(Continued)

*Primary Examiner* — Adam M Alharbi
(74) *Attorney, Agent, or Firm* — Patrick J. S. Inouye; Krista A. Wittman (57) ABSTRACT

A computer-implemented system and method for dynamic travel coordination is provided. A common destination is designated for a group of travelers for arrival at a common time. A mode of travel and a set of travel criteria are designated for each traveler. The travel criteria are determined for at least one of the travelers by receiving travel criteria for the at least one traveler from another traveler and receiving from the at least one traveler modifications to the received travel criteria. An initial route to the common destination at the common arrival time is created for each of the travelers based on the travel mode and travel criteria for that traveler. The initial route of one or more of the travelers is revised based on at least one of that traveler's designated travel criteria, a progress of one or more of the travelers, and travel conditions of the initial route.

20 Claims, 6 Drawing Sheets

(56) References Cited

U.S. PATENT DOCUMENTS

| | | | |
|---|---|---|---|
| 2010/0161392 A1* | 6/2010 | Ashby | G06Q 30/02 |
| | | | 705/13 |
| 2012/0041672 A1 | 2/2012 | Curtis et al. | |
| 2012/0197431 A1 | 8/2012 | Toebes et al. | |
| 2012/0209636 A1* | 8/2012 | Sloan | G06Q 50/30 |
| | | | 705/5 |
| 2013/0245810 A1 | 9/2013 | Sullivan et al. | |
| 2014/0081764 A1* | 3/2014 | James | G06Q 30/0265 |
| | | | 705/14.63 |

* cited by examiner

COMPUTER-IMPLEMENTED SYSTEM AND METHOD FOR DYNAMIC TRAVEL COORDINATION

CROSS-REFERENCE TO RELATED APPLICATION

This patent application is a continuation of U.S. patent application, Ser. No. 14/954,781, filed Nov. 30, 2015, pending, which is a continuation of U.S. Pat. No. 9,200,911, issued Dec. 1, 2015, the disclosures of which are incorporated by reference.

FIELD

This application relates in general to route planning and, in particular, to a computer-implemented system and method for dynamic travel coordination.

BACKGROUND

Coordinating a gathering of multiple people with multiple transportation options for travel to a specific place at a specific time can be of tremendous value. In the Battle of Waterloo, Napoleon desperately waited for the arrival of his reinforcements when instead his opponent Blücher arrived with a Prussian army and swept him away from the field of battle and thereby the stage of history. Today, businesses lose large amounts of productive hours due to the intractable and nettlesome late arrival of employees at meetings or work. Similarly, in a social context, disparate arrival of participants of a social event to a destination, such as a restaurant, can jeopardize the success of the event.

Coordinating simultaneous arrival of multiple people at a specific place is complicated due to the large number of factors involved. For example, each person may have his or her own preference on mode of transportation, including walking, jogging, biking, driving, car-pool, bus, subway, light rail, train, ferry, and taxi. The preference can be influenced by cost, speed, convenience, and reliability of the transport and further shaped by a person's habit and value system. Travelers to a specific location may also have social preferences such as an inclination or aversion to the company of a fellow traveler. A traveler, for instance, may prefer to meet another traveler en route to the event, since joining together in travel tends to decrease the travel cost, increase comfort, and provide opportunity to socialize. Another factor contributing to the complexity is the random but frequent traffic delays that are almost unavoidable for a large group of travelers taking various modes of transportation. As the number of travelers to a specific location grows, the challenge becomes daunting to devise a travel plan for on-time arrival while accommodating each traveler's location, travel preferences, and accounting for unexpected traffic delays.

Given the importance of the coordinated arrival, significant efforts and resources have been invested in facilitating the accomplishment of this goal; however, the result has generally not been satisfactory. For example, Google Map™ allows a user to input a starting point and a destination, and returns route suggestions and estimated time of travel. A user may select a mode of transportation including car, bus, biking, and walking. A mobile version may track the location of a traveler and send an alert of a traffic jam through a display. However, Google Map only provides advice to individual users and does not perform functions required to coordinate arrivals of multiple people. Mapquest® and other similar applications provide comparable functions to those of Google Map™, and do not remedy the shortcomings of Google Map™.

U.S. Patent Application No. 20120041672, entitled "Automated Social Routing" to Scott Curtis et al. ("Curtis"), discloses systems and methods for providing automated social routing. After a user provides a starting point and a stopping point, multiple suggestions of travel routes are made on account of other users' usage or rating of the routes. Thus, Curtis focuses on locating a route by consensus and does not address joining fellow travelers and does not solve the challenge of coordinating simultaneous arrival of multiple people from disparate locations to a designated location at a designated time.

U.S. Patent Application No. 20080293430, entitled "Method, Apparatus and Computer Program Product for a Social Route Planner" to Jan Blom et al. ("Blom"), discloses a system and method of obtaining social information associated with a particular area and a traveler, associating the social information with a candidate route through the particular area, and making a recommendation on a route. Blom focuses on recommending a route to a solo traveler based on information gathered about the traveler and does not coordinate a group to reach a desired destination.

Therefore, a need remains for a way to dynamically coordinate simultaneous arrival of multiple people from disparate locations to a specific place at a specific time, while taking into account each person's preferences.

SUMMARY

Social routing can be provided by a social router system that coordinates a group of travelers from disparate locations to reach a destination at a specified time, by dynamically recommending a traveling route to each of the travelers that comports with that traveler's traveling criteria. To recommend the route, the social router generates an initial route for each of the travelers and, if apropos, revises the initial route to join two or more travelers into one route en route to the destination based on the traveling criteria of the two or more travelers. The recommended traveling route is dynamic since the social router continuously revises the traveling route based on changes of the traveling criteria, travel progress and conditions along the route.

One embodiment provides a computer-implemented system and method for dynamic travel coordination. A common destination is designated for a group of travelers for arrival at a common time. A mode of travel and a set of travel criteria are designated for each traveler. The travel criteria are determined for at least one of the travelers by receiving travel criteria for the at least one traveler from another traveler and receiving from the at least one traveler modifications to the received travel criteria. An initial route to the common destination at the common arrival time is created for each of the travelers based on the travel mode and travel criteria for that traveler. The initial route of one or more of the travelers is revised based on at least one of that traveler's designated travel criteria, a progress of one or more of the travelers, and travel conditions of the initial route.

Companies stand to reduce wasted hours and increase work efficiency if they can provide an optimum travel route to their employees, track their employees' travel progresses, and offer an alternative route instantly when the original route is disrupted. In social gatherings, planning will be made easier when a host can present guests with a list of transportation options, routes, and departure times. Guests will save both time related to figuring out a route and anxiety associated with a tardy arrival.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

DETAILED DESCRIPTION

Figure 1:
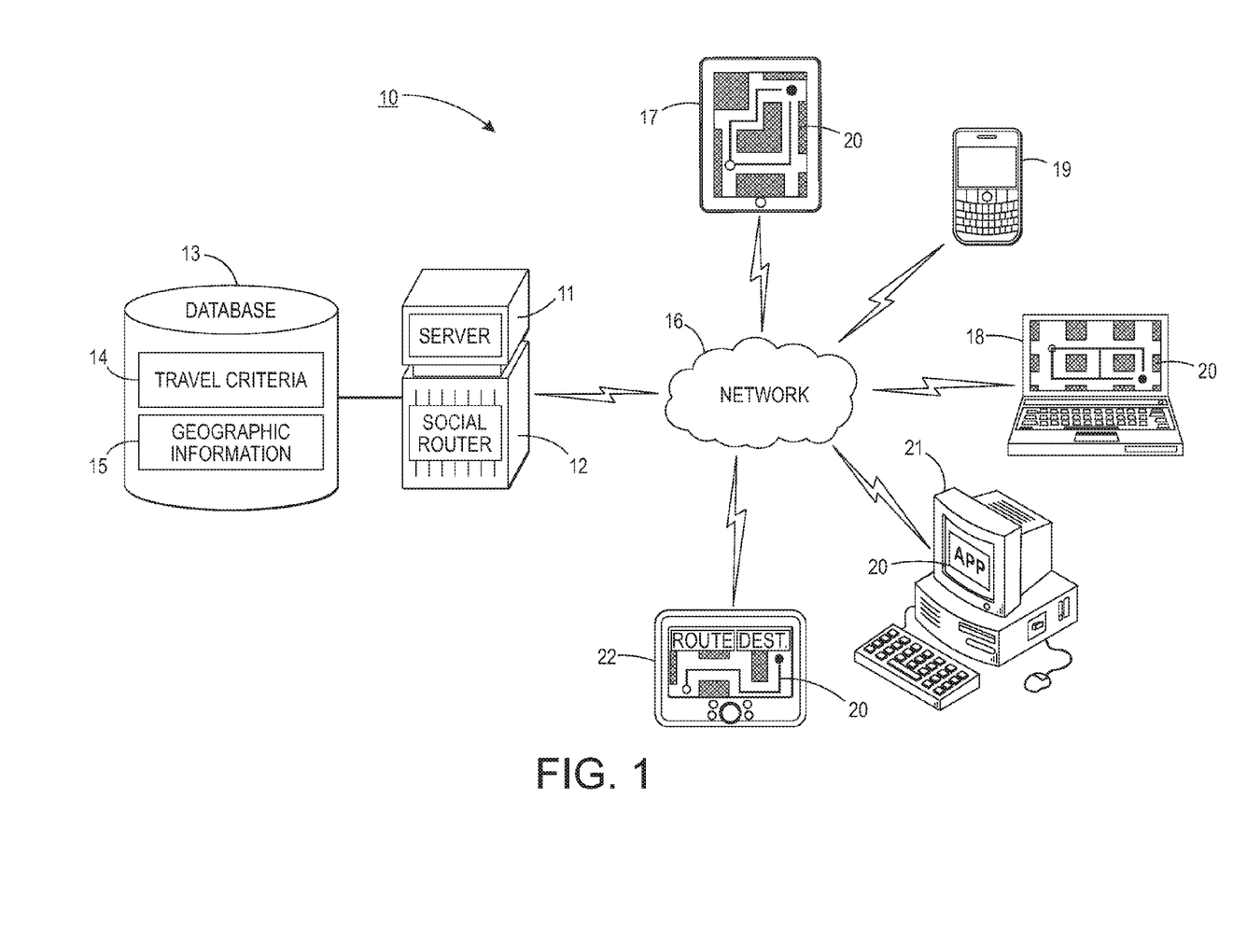
FIG. 1 is a functional block diagram showing a system for dynamically coordinating multiple travelers to arrive at a specific place on a specific time, according to one embodiment.

Route planning can be provided through a social routing system usable by a group of travelers who want to coordinate their travels to a specific location to arrive at the same time. The system can include social router software installed in a server and client software installed in user devices. FIG. 1 is a functional block diagram showing, by way of example, a social routing system 10, including a server 11 in accordance with one embodiment, upon which a social router 12 is installed on the server. The server 11 may comprise one or more central processing units (CPUs); a high-speed, short-term data storage means; an input-output or bus controller; a lower-speed, permanent or semi-permanent data storage means; and a operating system software or operating environment. The social router is connected to a database 13 that stores a collection of travel criteria 14 and geographic information 15. The social router 12 is connected, through a network 16, to devices including a smartphone 17, a laptop 18, a dumbphone 19, a desktop 21, or a tablet 22. The dumbphone 19 can be a basic cell phone that lacks the advanced functionality characteristic of a smartphone. The server 11, database 13, smartphone 17, laptop 18, dumbphone 19, desktop 21, and tablet 22 are all interconnected over the network 16, which could be a local area network, enterprise network, or wide area network, including the Internet and cellular network, or some combination thereof. Other devices are possible. The client software 20, or App 20, can be installed in a device including a smart phone 17, a laptop 18, a dumbphone 19, a desktop 21, or a tablet 22. Other configurations are possible.

The travel criteria 14 includes many factors. The travel criteria includes a traveler's preference or aversion to a mode of transportation, which includes walking, jogging, biking, driving, car-pool, bus, subway, light rail, train, ferry, and taxi. For example, a traveler prefers driving to walking; as result this traveler's travel criteria will be marked by driving over walking. A travel criterion can be modified. Continuing with the aforementioned example of the traveler who prefers driving to walking: if the traveler loses his or her driving privilege for a period of time, the travel criteria is modified to reflect the loss of the driving option during the period of time when the loss of the driving privilege is in force.

The travel criteria may include a traveler's tolerance for cost. For example, a traveler may set up a limit that the traveler is willing to pay for a trip. The travel criteria may include a speed of travel. For example, a traveler may specify a minimum or maximum of speed of travel within which the traveler will consider adopting the mode of transportation. The travel criteria may include a travel time. For example, a traveler may specify a preference for a shorter travel time over longer travel time. The travel criteria may specify a travel time he or she would like to spend on a particular travel. The travel criteria may include convenience, which includes the ease to use of a mode of transportation. For example, a traveler may specify the maximum distance the traveler is willing to walk before getting onto a bus. A long walk would be considered an inconvenience. In another example, a traveler may specify a maximum time she or he is willing to wait for a bus to arrive, since a long wait would be considered an inconvenience.

The travel criteria may include reliability of a mode of transportation. Reliability may include a rate of on-time arrival, a probability for accident, a frequency of unexpected delay, or a real or perceived measure for safety. The travel criteria may include a traveler's habit. For example, a traveler may prefer, out of habit, to use a subway line over a bus line, despite the bus line covering the same route as the subway line. The travel criteria also include traveler's value system. For example, a traveler may place high value on environmental preservation; thus the traveler would prefer walking to motoring when a destination is within a walking distance, and would prefer car-pool over driving when a destination is beyond the walking distance. Other travel conditions are possible.

In one embodiment, a traveler may input his or her travel criteria into the travel database 14. In another embodiment, a traveler's travel criteria may be determined based on the travel's prior travel choices. In still another embodiment, a traveler may authorize another party to input the traveler's travel criteria into the travel database 14. In still another embodiment, a traveler or an authorized third party may modify or alter the traveler's travel criteria. In still another embodiment, an event organizer may suggest or override a traveler's travel criteria.

The geographic information 15 includes information that impacts a choice of a travel route. For example, the distance between two locations is geographic information. The geographic information also includes information on the traffic routes between to physical locations, including any route that connects the two locations, any mode of transportation that covers the route, a speed that any mode of transportation displays, and an operational schedule of that any mode of transportation adopts. Other geographic information is possible. Geographic information is dynamic and may be updated from time to time.

The social router 12 generates recommendations of routes to the travelers in processes that will be described infra. The recommendations of the routes are sent to travelers via the network 16 such an internet, in one embodiment. The internetworks includes the Internet. Other setups, such as an intranet, or a lined connection, are possible. The recommendations of the routes are received through the App 20 installed on a device that includes a smart phone 17, a laptop 18, a dumbphone 19, a desktop 21, or a tablet 22. Other devices are possible. The recommendation may be displayed on the devices or conveyed to a traveler through the device. The conveyance of the recommendation may take the form of any means that may alert or inform a traveler, including sound, motion, smell, light, and visual cues. The recommendation may be sent via a short message. Other forms, ways and methods are possible.

Figure 2:
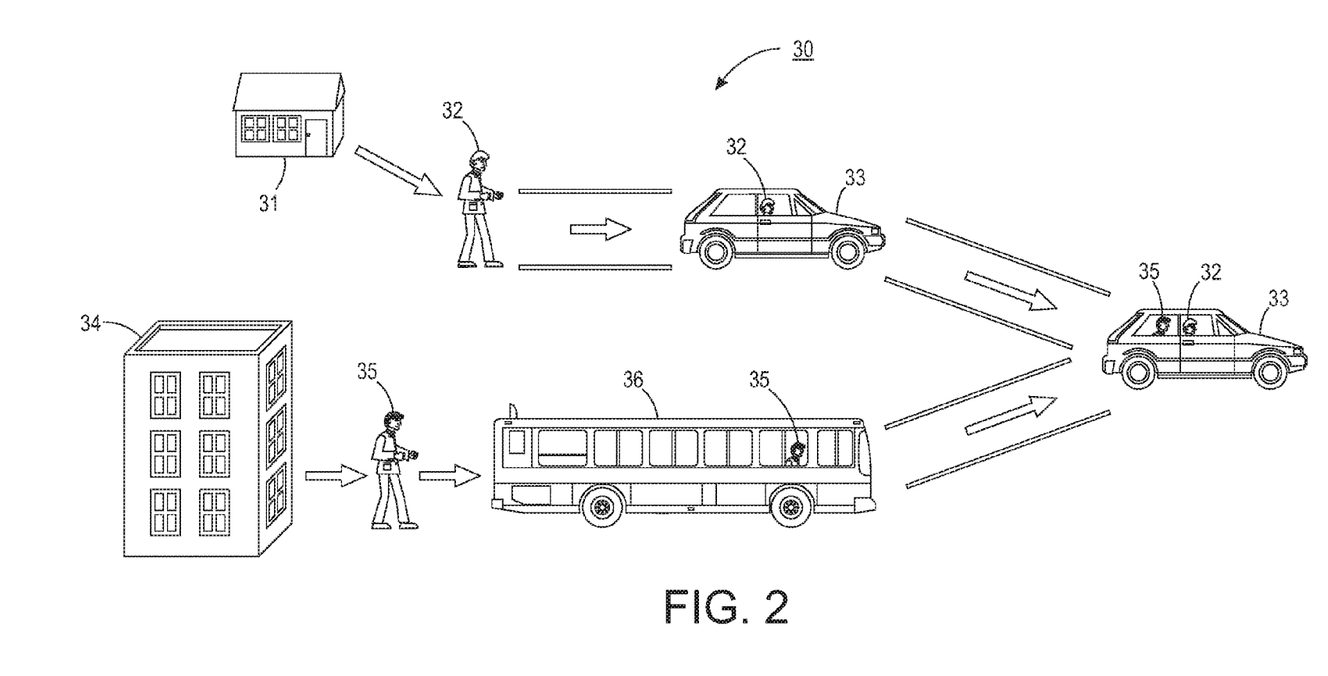
FIGS. 2, 3, and 4 are diagrams showing, by ways of example, the coordination of multiple travelers on their travel routes using a social router.
Figure 3:
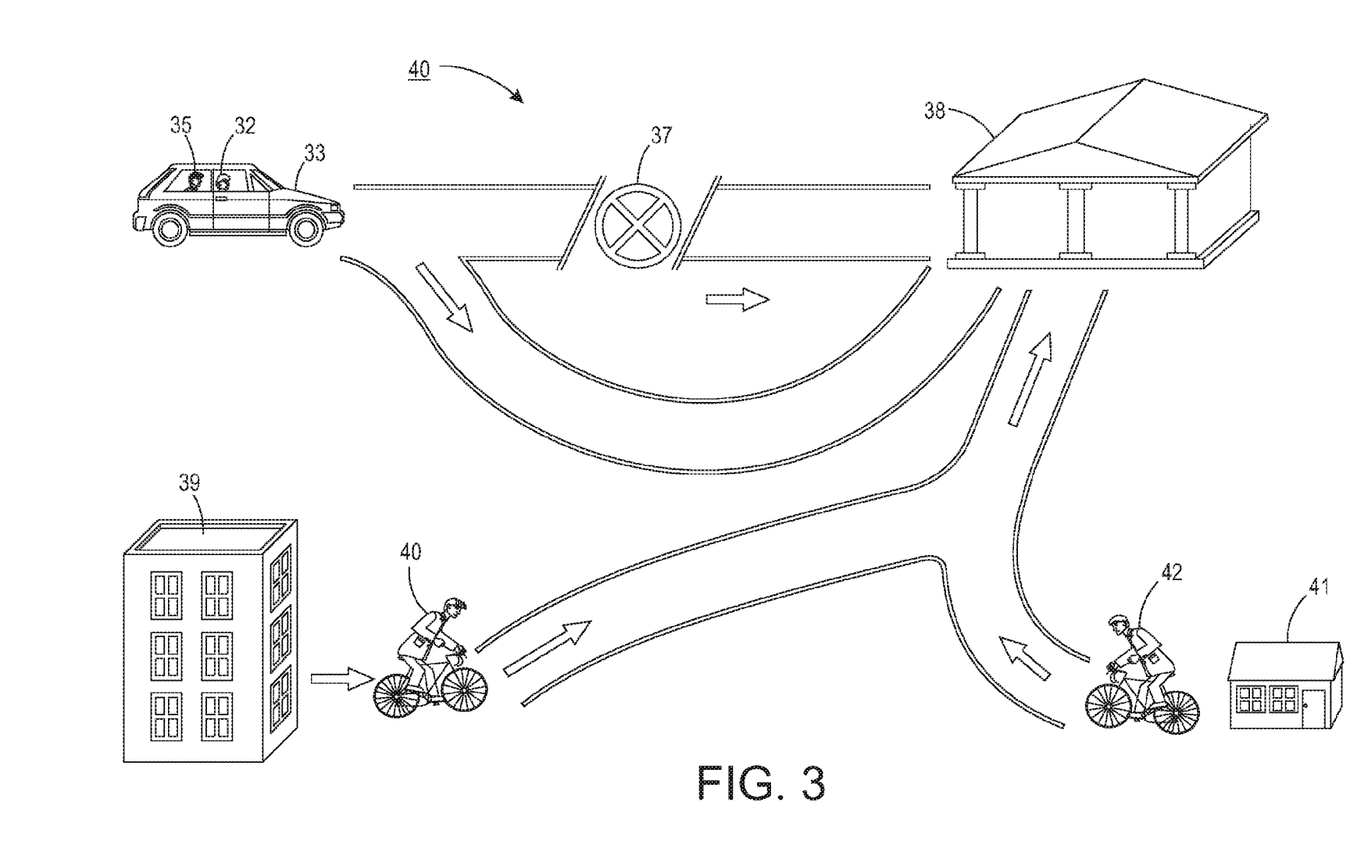
Figure 4:
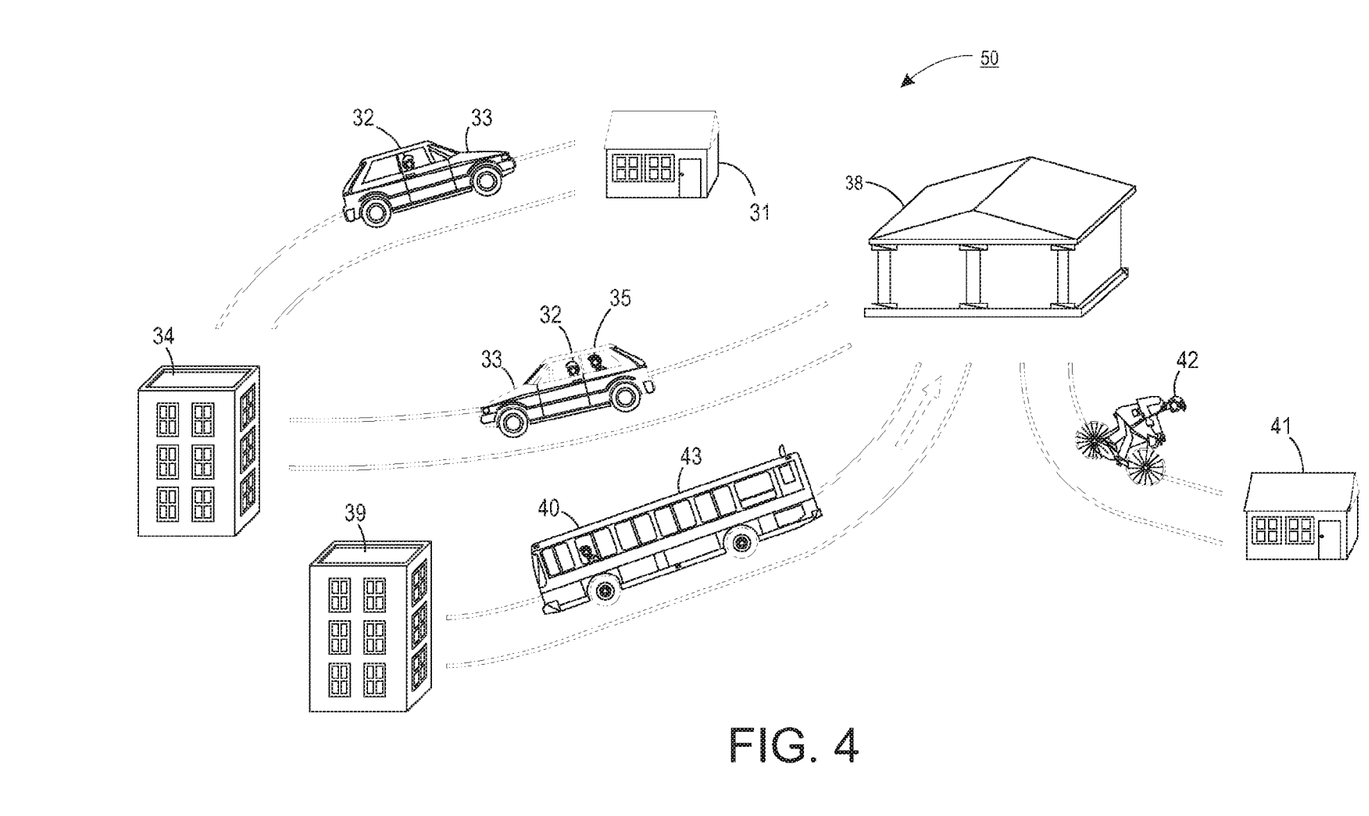

The social router 12 directs a process to coordinate multiple travelers from disparate locations to reach a destination at a specific time. FIGS. 2, 3, and 4 are illustrative diagrams showing examples the social router coordinating a social gathering as a specific place at a specific time. Allan 32, Barbara 35, Cathy 40, and Dave 42 are meeting up for dinner in a restaurant 38 in a downtown area of a heavily populated city. Allan 32 enters a location of the restaurant 38 into the social router 12 and invites Barbara 35, Cathy 40, and Dave 42 to join him at a specific time. Allan 32, Barbara 35, Cathy 40, and Dave 42 set their travel options. Allan 32 drives a car 33 from his house 31; Barbara 35 walks out of her apartment 34 to take a bus 36; Cathy 40 bikes out of her office 39, and Dave 42 bikes out of his house 41. The social router 12 detects their starting locations: Allan 32 is at his house 31, Barbara 35 is at her apartment 34, Cathy 40 is at her work 39, and Dave 42 is at his house 41.

In another embodiment, the travelers may enter their locations into the social router to set as the starting points. The social router 12 derives a route for Allan 32, Barbara 35, Cathy 40, and Dave 42 in their respective mode of transportation. The social router 12 further identifies that Allan 32 may pick up Barbara 35 in a bus stop along her way, and give Barbara 35 a ride to the restaurant 38. The social router 12 compares the stored travel criteria of Barbara 35 to Allan's route, and finds no incompatibility that prevents Barbara 35 from taking advantage of Allan's car 33. Examples of the incompatibilities may include a social aversion between Allan and Barbara and Barbara's objection to riding a car. The social router 12 sends recommendations to Allan 32 and Barbara 35 about their routes, departures times, and a rendezvous place based in part on the locations of bus stops and a schedule of the bus. After receiving the recommendation from the social router 12, Allan 32 departs on the recommended route and time, picks up Barbara 35 without a hitch, but finds themselves ensnared in a heavy traffic blockage 37 caused by an unexpected traffic accident. The social router 12 advises a detour for Allan 32 and Barbara 35. Estimating they will be 15 minutes late, the social router 12 alerts Cathy 40 and Dave 42, as well as the restaurant 38. The restaurant 38 confirms that their reservation will be held and that two seats will be available at the bar for Cathy 40 and Dave 42. As a passenger, Barbara 35 takes advantage of additional functions of the social router 12 to pre-order drinks for herself and Allan 32.

Cathy 40 and Dave 42 start off from different parts of the city. The social router determines a possible route where Cathy 40 and Dave 42 may meet before biking to the restaurant 38 together. Cathy 40 and Dave 42 follow the social router's recommendation on their routes and departure times and arrive at the restaurant 38 together on time. They are informed of the 15 minutes delay through the message sent from the social router 12 to their portable devices. They chatted at the bar for 10 minutes before moving into their reserved table. Allan 32 and Barbara 35 walk in to their table and drinks, having parked their car in a nearby parking spot located by the social router 12.

After leaving the restaurant 38, the social router 12 recommends a route home to each person (FIG. 4). Allan 32 drops Barbara 35 off on her apartment 34 before driving home 31 in his car 33. Cathy 40 chooses a bus 43 after the social router 12 informs her that her bike route will likely be visited by an inclement weather. Dave 42 bikes home 41 on his original route based on the social router's recommendation.

Figure 5:
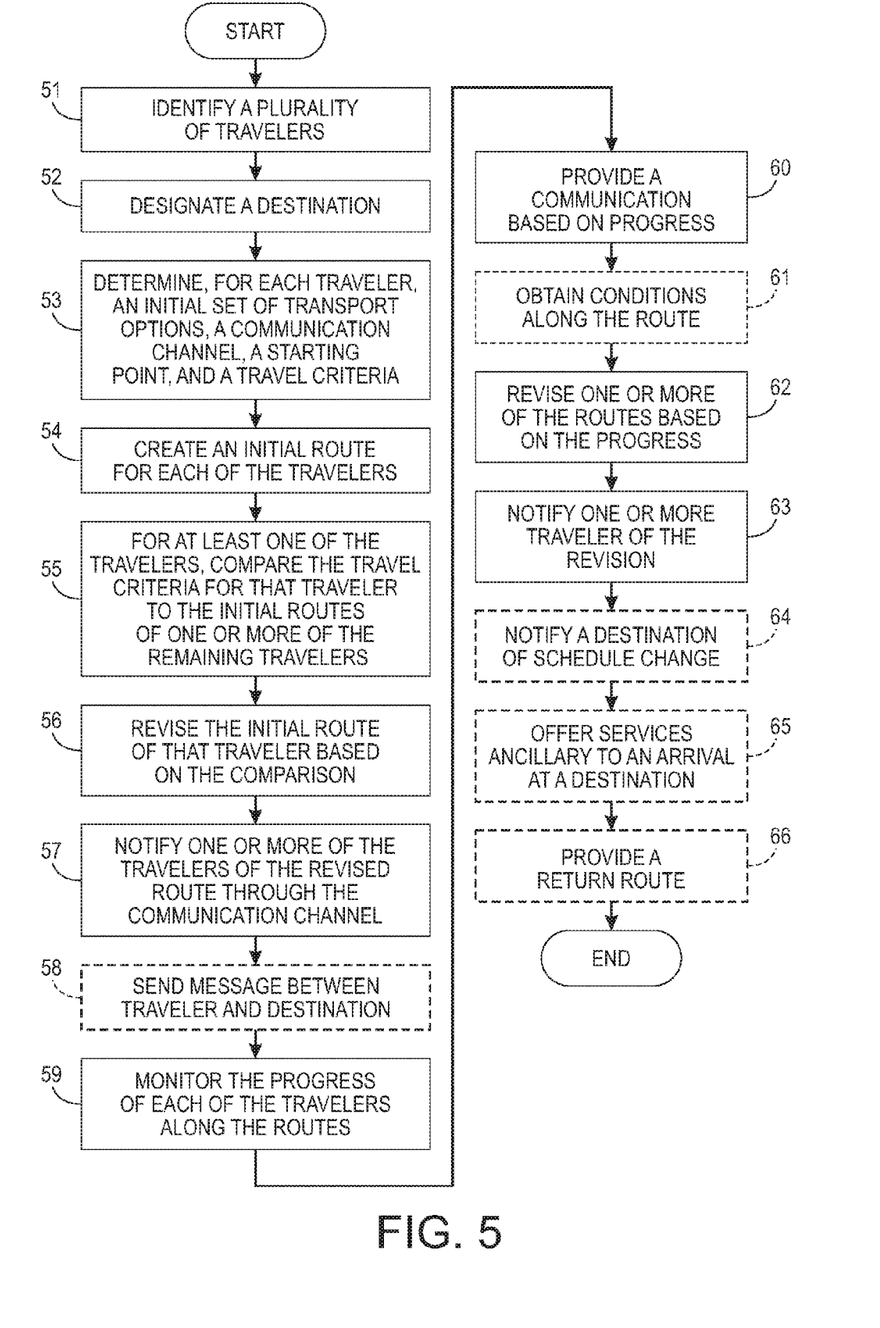
FIG. 5 is flow diagram showing a social router-implemented method for coordinating simultaneous arrival of multiple parties from disparate locations to a specific place at a specified time.

Once a group of travelers, a destination, and an arrival time are specified, the social router 12 comes up with a travel route for each travelers according to that traveler's travel option and travel criteria, recommends the travel route to each of the travelers, continually monitors the progress of the travel, and recommends an alternative route when the original routes are not feasible or require change. FIG. 5 is a flow diagram showing a method for coordinating simultaneous arrival of multiple parties from disparate location to a specific place at a specified time, in accordance with one embodiment. A plurality of travelers is identified (step 51). These travelers are persons invited to arrive at a location at a specific time. These travelers may be notified through the social router 12 or other means including email, phone, text, and so forth. A new traveler may be added after other travelers have been notified, or even after at least one of the other travelers have commenced on traveling. An existing traveler may be disinvited and dropped from the route calculation. A traveler may opt out an event through the App 20, upon which, the social router may choose to cease to include the opt-out traveler in the route calculation and recommendation. However, the social router may still notify a non-traveler person the progress of other travelers. Both a traveler and a non-traveler can use the social router to plan, coordinate, and monitor the simultaneous arrival of multiple parties from disparate locations.

After a plurality of travelers is identified, a destination is designated (step 52). In another embodiment, a destination is designated before a plurality of travelers is identified. In still another embodiment, a destination is designated at the same time as when at least one of a plurality of travelers is identified.

The social router 12 determines, for each traveler, an initial set of transport options, a communication channel, a starting point, and a travel criteria (step 53). The initial set of transport option may include walking, jogging, biking, driving, car-pool, bus, subway, light rail, train, ferry, and taxi. In one embodiment, a traveler may enter into the database 13 that traveler's transport option. In another embodiment, the social router may recommend an initial set of transport options for a traveler based on an availability of those transport options at a current or future location of the traveler.

A communication channel may be a device including a smart phone 17, a laptop 18, a dumbphone 19, a desktop 21, or a tablet 22. In one embodiment, a device used as the communication channel is installed with the App 20. In another embodiment, a device used as the communication channel is separate from another device in which the App 20 is installed.

The travel criteria has been described supra. A travel criteria for each of the travelers may be created by that traveler, or generated by an event organizer, or generated by another traveler and proposed to that traveler for confirmation. The travel criteria may be modified by that traveler. In one embodiment, a traveler enters his or her travel criteria into the travel criteria database 14. In another embodiment, the social router replicates a travel criteria used by a traveler in a previous travel. In still another embodiment, the social router records a traveler's previous travel routes and extrapolates the traveler's travel criteria.

Figure 6:
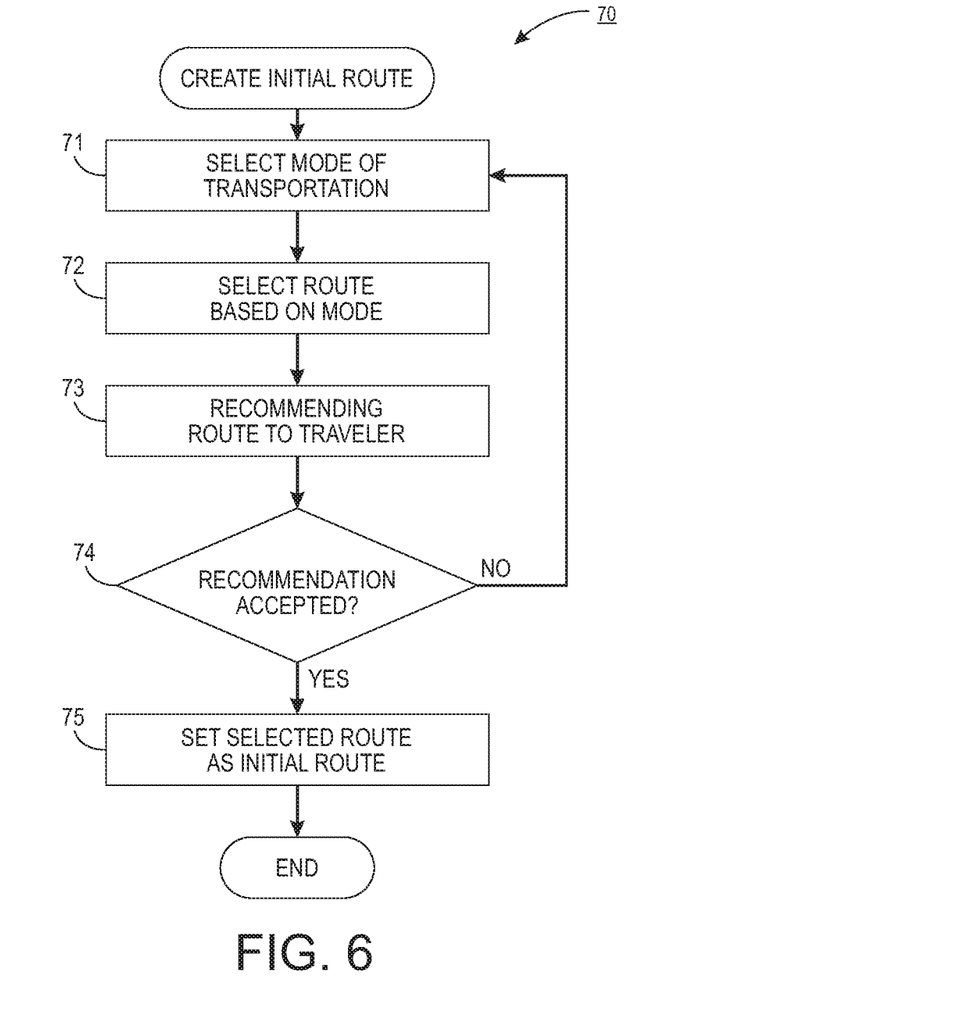
FIG. 6 is a flow diagram showing a method for generating an initial route of travel, in accordance with one embodiment.

After determining, for each traveler, an initial set of transport options, a communication channel, a starting point, and a travel criteria, the social router 12 creates an initial route for each of the travelers (step 54) as further described infra with reference to FIG. 6. For at least one of the travelers, the social router 12 compares the travel criteria for that traveler to the initial routes of one or more of the remaining travelers (step 55), and revises the initial route of that traveler based on the comparison (step 56), in accordance with one embodiment. In another embodiment, the social router 12 evaluates the time cost for each possible pair of travelers to meet up en route to a destination if their travel criteria allow that pair to meet en route. If the time cost is under a certain threshold, the social router 12 assigns a possible join to that pair. When a possible join is made, the joined pair is treated as one traveler in the following round of pairing evaluation, in which the time cost for each remaining possible pair of the travelers meeting up en route to a destination is evaluated if their travel criteria allows that pair to meet en route. The routes are continuously revised, as these cycles of pairing evaluations continue, until an overall route for the group is devised. In still another embodiment, possible joins can be ranked and the overall route can also be ranked. The overall route is updated dynamically as the travelers travel along their routes or alter their travel criteria.

The travel criteria includes the modes of transportation. Some types of modes of transportation are appropriately joinable. Examples of joinable modes of transport includes, but not limited to, a car picks up a pedestrian; a car equipped with a bicycle rack picks up a bicycle rider, a car picks up a passenger from another car or a bus; a car picks up the driver of another car while leaving the other car in a suitable place such as a parking lot, a pedestrian or a bicycle rider gets on a bus, a pedestrian joins another pedestrian, and a bicycle rider joins another bicycle rider. Some types of modes of transportation are non-joinable. Examples of non-joinable modes of transportation includes: a car generally cannot tow another car unless specially equipped to do so, a bus cannot pick up another car, and a train cannot pick up a car, among others. These examples are for illustrative purpose and other examples are possible.

The travel criteria also includes social preference or aversion. For example, a traveler may specify a refusal to travel with another traveler, as a result, the social router 12 will not pair these two travelers during its pairing evaluation.

The routes generated from the social router 12 are notified to one or more travelers through the communication channel (step 57). In one embodiment, a notification may be sent through an internetworks. In another embodiment, a notification may be sent to a device such as a smartphone, a dumbphone, a desktop computer, a laptop computer, and a tablet. Optionally, a message may be forwarded between one or more travelers and the destination using one or more communication channels to communicate acceptance, refusal, confirmation, invitation, reminder, suggestion, discussion, and other responses (step 58). The communication may be sent through the communication channel or the social router.

The social router 12 continues to monitor the progress of each of the travelers along the routes (step 59). In one embodiment, one or more of the travelers is associated with a tracking device and a physical location of the one or more of the travelers is determined using the tracking device. In another embodiment, the tracking device is a Global Positioning System (GPS) device. In still another embodiment, the location of a traveler may be manually entered into the social router. The social router 12 provides a communication based on a travel progress of a traveler (step 60). In one embodiment, the social router 12 tracks a time elapsed since the onset of a traveler's travel and tracks a distance the traveler has covered, derives an actual time cost for the distance traveled, compares the actual time cost with a calculated time cost used to generate the original route recommendation, and provides a message to that traveler if the actual time cost exceeds the calculated time cost by a certain threshold. In another embodiment, the social router 12 may provide a communication regarding a travel progress to another traveler, a destination, or a third party.

The social router 12 revises one or more of the routes based on a progress of a traveler along a travel route (step 62). In one embodiment, when the time spent on a segment of the route exceeds the calculated time cost for that segment by a threshold, the social router 12 revises the travel routes. For example, a traveler drives to a park-and-ride station in order to take a bus to a destination. The traveler misses a turn, and takes a long detour to revert back to target. The social router 12 tracks the progress of the traveler and determines the traveler will miss the bus slated in the original travel plan. The social router 12 determines that taking the next bus would cause one-hour delay. The social router 12 revises the travel route to driving all the way to the destination and recommends a driving route that will allow an on-time arrival.

Optionally, the social router 12 also obtains conditions along a route (Step 61), and revises the route based on the conditions (step 62). The conditions along a route include traffic jams, road closures, schedule changes for a mode of transportation, weather, and other conditions that impact a traveler. Other conditions are possible. The social router 12 revises one or more of the routes if the conditions along a travel route substantially impacts the travel progress as to jeopardize the on-time arrival of a traveler using that travel route (step 62). In one embodiment, a traveler drives on a highway to a destination when an accident-induced traffic blockage is developing a few miles down the highway. The social router 12 detects the traffic blockage and revises the route to bypass the blockage. In another embodiment, a traveler on a bike pedals to a destination. The social router 12 detects a rainfall along the traveler's path and revises the route to a bus ride prior to venturing into the inclement weather. Still other operations and steps are possible.

When a revision is made, the social router 12 notifies one or more travelers of the revision (step 63). In one embodiment, the social router 12 notifies other travelers of a revised arrival time. Optionally, the social router 12 notifies the travel destination the revised arrival time (step 64).

Further optionally, the social router 12 may offer services ancillary to an arrival at a destination (step 65). In one embodiment, a traveler may use the social router 12 to initiate transactions that are performed at a travel destination. In another embodiment, the social router 12 may receive a notice from a travel destination. In still another embodiment, the social router 12 may locate an available parking in the vicinity of a destination for a traveler driving a vehicle, by identifying a plurality of parking spaces in a proximity to the destination, obtaining data regarding the availability of the spaces, selecting one of the parking spaces based on the availability and the specific time, and notifying one of the travelers regarding the selected spot. Still further optionally, the social router 12 provides a return route from a destination to a starting point for at least one of the travelers to the destination (step 66).

The social router 12 creates an initial route for each travelers, revises the initial route for each of the travelers according to a travel criteria of each of the travelers, and generates an overall travel routes for the whole group, before notifying each of the travelers of the recommended travel routes. FIG. 6 is a functional block diagram describing the process of creating an initial route. A plurality of travelers are identified. For each of the travelers, the social router 12 selects a mode of transportation (step 71). The selection can be based on the location of the traveler, access to a mode of transportation, or travel criteria stored in the database. The selection can also be based the choice made by the traveler. Based on the mode of transportation, the social router 12 selects a route (step 72). Based on the selected route, the social router 12 recommends the route to the traveler (step 73). The traveler is notified of the recommended route and may choose either to accept or decline (step 74). If the traveler rejects the recommendation, the social router 12 start the process from beginning by selecting another mode of transportation or another combination of modes of transportation. If the traveler accepts the recommendation, the social router 12 selects the recommended routes as the initial route.

While the invention has been particularly shown and described as referenced to the embodiments thereof, those skilled in the art will understand that the foregoing and other changes in form and detail may be made therein without departing from the spirit and scope.

What is claimed is:

1. A system for dynamic travel coordination, comprising:
a destination designation module to designate a common destination for a group of travelers for arrival at a common time;
a criteria designation module to designate for each traveler, a mode of travel and a set of travel criteria;
a criteria determination module to determine the travel criteria for at least one of the travelers by receiving travel criteria for the at least one traveler from another traveler and receiving from the at least one traveler modifications to the received travel criteria;
a route creation module to create for each of the travelers in the group an initial route to the common destination at the common arrival time based on the travel mode and travel criteria for that traveler; and
a route revision module to revise the initial route of one or more of the travelers based on at least one of that traveler's designated travel criteria, a progress of one or more of the travelers, and travel conditions of the initial route.

2. A system according to claim 1, further comprising:
a time revision module to revise the common arrival time based on the revised route of the one or more travelers; and
a notification module to send a notification of the revised arrival time to the other travelers in the group.

3. A system according to claim 1, further comprising:
a joinder module to join two or more of the travelers together based on the travel modes and travel criteria of those travelers; and
the route revision module to revise the initial routes of at least one of those travelers based on the joinder.

4. A system according to claim 1, further comprising:
a progress determination module to determine the progress of one such traveler, comprising:

a time cost determination module to determine a calculated time cost for at least one segment of the initial route for the traveler;
a time tracker to track a time spent by the traveler to travel that segment; and
a threshold module to revise the initial travel route of the traveler when the time spent exceeds the calculated time by a predetermined threshold.

5. A system according to claim 1, further comprising:
a route transmission module to provide the initial route to each traveler;
a feedback module to receive from one or more of the travelers a rejection of the initial route provided; and
the route creation module to determine a further initial route for that traveler.

6. A system according to claim 1, further comprising:
a time tracker to track a time elapsed since traveling commencement of one such traveler;
a distance tracker to track a distance traveled by the traveler;
a time cost determination module to derive an actual time cost for the distance traveled;
a time comparison module to compare the actual time cost with a calculated time cost based on the initial route for the traveler, and
a notification module to provide a notification to one of the traveler, another traveler, and the common destination when the actual time cost exceeds the calculated time cost.

7. A system according to claim 1, further comprising at least one of:
a removal module to remove one of the travelers from the group of travelers; and
an addition module to add a further traveler to the group of travelers.

8. A system according to claim 1, wherein each of the travelers in the group commences travel at different origins.

9. A system according to claim 1, further comprising:
a travel mode receipt module to receive a second mode of travel for one of the travelers; and
the route creation module to determine the initial route for that traveler based on the mode of transportation and the second mode of transportation.

10. A system according to claim 1, further comprising:
a delivery module to provide one or more of the travelers in the group with one or more modes of travel based on an availability of those travel modes at an originating location of that traveler.

11. A method for dynamic travel coordination, comprising:
designating a common destination for a group of travelers for arrival at a common time;
designating for each traveler, a mode of travel and a set of travel criteria;
determining the travel criteria for at least one of the travelers, comprising:
receiving travel criteria for the at least one traveler from another traveler; and
receiving from the at least one traveler modifications to the received travel criteria;
creating for each of the travelers in the group an initial route to the common destination at the common arrival time based on the travel mode and travel criteria for that traveler; and
revising the initial route of one or more of the travelers based on at least one of that traveler's designated travel criteria, a progress of one or more of the travelers, and travel conditions of the initial route.

12. A method according to claim 11, further comprising:
revising the common arrival time based on the revised route of the one or more travelers; and
sending a notification of the revised arrival time to the other travelers in the group.

13. A method according to claim 11, further comprising:
joining two or more of the travelers together based on the travel modes and travel criteria of those travelers; and
revising the initial routes of at least one of those travelers based on the joinder.

14. A method according to claim 11, further comprising:
determining the progress of one such traveler, comprising:
determining a calculated time cost for at least one segment of the initial route for the traveler;
tracking a time spent by the traveler to travel that segment; and
revising the initial travel route of the traveler when the time spent exceeds the calculated time by a predetermined threshold.

15. A method according to claim 11, further comprising:
providing the initial route to each traveler;
receiving from one or more of the travelers a rejection of the initial route provided; and
determining a further initial route for that traveler.

16. A method according to claim 11, further comprising:
tracking a time elapsed since traveling commencement of one such traveler;
tracking a distance traveled by the traveler;
deriving an actual time cost for the distance traveled;
comparing the actual time cost with a calculated time cost based on the initial route for the traveler, and
providing a notification to one of the traveler, another traveler, and the common destination when the actual time cost exceeds the calculated time cost.

17. A method according to claim 11, further comprising at least one of:
removing one of the travelers from the group of travelers; and
adding a further traveler to the group of travelers.

18. A method according to claim 11, wherein each of the travelers in the group commences travel at different origins.

19. A method according to claim 11, further comprising:
receiving a second mode of transportation for one of the travelers; and
determining the initial route for that traveler based on the mode of transportation and the second mode of transportation.

20. A method according to claim 11, further comprising:
providing one or more of the travelers in the group with one or more modes of travel based on an availability of those travel modes at an originating location of that traveler.

* * * * *